United States Patent
Su et al.

(10) Patent No.: US 6,872,335 B2
(45) Date of Patent: Mar. 29, 2005

(54) METHOD AND APPARATUS FOR HOLDING A MOLD ASSEMBLY AND MOLDING AN OPTICAL LENS USING THE SAME

(75) Inventors: Kai C. Su, Alpharetta, GA (US); Richard Lu, Alpharetta, GA (US)

(73) Assignee: Technology Resource International Corporation, Alpharetta, GA (US)

( * ) Notice: Subject to any disclaimer, the term of this patent is extended or adjusted under 35 U.S.C. 154(b) by 439 days.

(21) Appl. No.: 10/096,428

(22) Filed: Mar. 12, 2002

(65) Prior Publication Data

US 2003/0173692 A1 Sep. 18, 2003

(51) Int. Cl.[7] .............................................. B29D 11/00
(52) U.S. Cl. ..................... 264/2.5; 264/2.2; 264/1.32; 264/313; 249/82; 425/395; 425/808
(58) Field of Search ......................... 264/2.5, 2.2, 1.32, 264/313; 249/82; 425/395, 808

(56) References Cited

U.S. PATENT DOCUMENTS

| | | | |
|---|---|---|---|
| 2,406,361 A | 8/1946 | Fairbank et al. | |
| 3,211,811 A | 10/1965 | Lanman | |
| 4,497,754 A | 2/1985 | Padoan | |
| 5,213,825 A | 5/1993 | Shimizu et al. | |
| 5,547,618 A | 8/1996 | Magne | |
| 5,611,969 A | 3/1997 | Cano et al. | |
| 5,662,839 A | 9/1997 | Magne | |
| 6,099,764 A | 8/2000 | Su et al. | |

Primary Examiner—Chris Fiorilla
Assistant Examiner—Michelle Acevedo Lazor
(74) Attorney, Agent, or Firm—Merchant & Gould (57) ABSTRACT

An apparatus and method for holding a mold assembly and molding an optical lens using the same. In one aspect, the present invention provides an apparatus for holding a mold assembly, wherein the mold assembly includes a front mold, a back mold and a strip wrapping around the edges of the front mold and back mold to form a sleeve. In one embodiment, the apparatus includes a first portion and a second portion. The first portion has a top part, a bottom part, and a middle part connecting the top part and the bottom part, the middle part including a base and a holder coupled to the base. The second portion has a top part, a bottom part, and a middle part connecting the top part and the bottom part, the middle part including a base and a holder coupled to the base. The first portion and the second portion are pivotally coupled together at the bottom parts so that the top part of the first portion and the top part of the second portion can be closed to define a housing for receiving the mold assembly therein, wherein the top part of the first portion and the top part of the second portion can also be opened for receiving the mold assembly in the housing.

12 Claims, 8 Drawing Sheets

METHOD AND APPARATUS FOR HOLDING A MOLD ASSEMBLY AND MOLDING AN OPTICAL LENS USING THE SAME

BACKGROUND OF THE INVENTION

1. Field of the Invention

The present invention relates to an apparatus and method for holding a mold assembly and molding an optical lens using the same. In particular, the present invention relates to an apparatus and method of holding a mold assembly to mold an optical lens, wherein the mold assembly includes a front mold, a back mold and a strip wrapping around the edges of the front mold and the back mold to form a sleeve. Moreover, the present invention discloses an apparatus and method for holding an optical device such as a mold so that the optical surface of the mold is protected.

2. Background

Most lenses today are made by molding plastic because of its light weight, density, refractive index, and impact resistance. To form a lens, two molds, often referred to as a front mold and a back mold in the art of lens making, are used. Each mold has a facing inside surface or an optical surface. When these two molds are properly positioned at a desired distance and rotational orientation to each other, their facing inside surfaces are a negative image of the surfaces of the lens to be formed. A closure member is used to necessarily seal the cavity. Then a fluid lens-forming material, normally a liquid monomer, is placed and contained in the cavity defined by the two molds and the closure member. Once the fluid lens-forming material is in the cavity, it is cured to form a hardened polymeric lens taking the shape of the molds.

Two kinds of closure members are now used in making the lenses. The first kind of closure member is a gasket, which has been used widely in the art. Currently available gaskets are known as T-gaskets. Different T-gaskets are required to form varying power lenses because each T-gasket sets a predetermined axial separation between molds. Thus, in order to meet the requirements of various possible types and powers of lenses, a portfolio of different T-gaskets over a wide range of different geometrical characteristics is needed. Not only is it costly to create and keep such a portfolio, but even with a portfolio it is sometimes still impossible to meet a customer's need in a timely manner because the customer may require a lens with power or type outside the portfolio, and then a customer-tailored T-gasket has to be made.

A second kind of closure member has been proposed as an alternative. Namely, a closure member can be made by wrapping a strip around the edges of the molds and thus a molding cavity can be created on demand in situ at the last minute by the molds and the strip. A number of references discloses various ways to achieve this goal. One group of references discloses lens casting using two molds joined together using a strip by gluing or using adhesive tape to attach the strip to the molds to form a molding cavity. U.S. Pat. No. 5,213,825 issued to Shimizu et al., U.S. Pat. No. 4,497,754 issued to Padoan, U.S. Pat. No. 3,211,811 issued to Lanman, and U.S. Pat. Nos. 5,547,618 and 5,662,839 issued to Magne are some examples in this category. One drawback related to this approach is that traces of adhesives may remain on the molds and on the finished lens and, hence, a specific cleaning procedure must be utilized to clean up the adhesives. Moreover, because the molds are held firmly by adhesives once the molds are assembled and the molding cavity is formed, the molds cannot move relative to the tape, or within the tape during the lens casting process.

Attempting to avoid the drawbacks caused by adhesives, another group of references disclose lens casting simply using a strip of heat shrinkable synthetic material or similar deformable material to cooperate with the molds to form a molding cavity. For examples, U.S. Pat. No. 2,406,361 issued to Fairbank et al. and U.S. Pat. No. 5,611,969 issued to Cano et al. both disclose just using such tape to form the cavity into which monomer is injected. While this approach may have succeeded in avoiding the drawbacks caused by adhesives, it also does not allow the molds to move relative to the tape or within the tape once the molds are assembled and the molding cavity is formed. Therefore, to compensate any shrinkage of the lens forming material during the lens casting process, the tape used in these references must crumple or wrinkle. However, because the tape may not be crumpled or wrinkled uniformly under the pressure of the molds during the lens polymerization process, it may negatively impact the quality of the lens to be molded. Moreover, because the tape is heated to shrink it onto the molds tightly, separating the tape from the molds once the lens is made requires special care and extra effort, which increases labor cost and impedes automation of the molding process. Furthermore, all cited references which disclose using the tape arrangement do not have the flexibility to adjust the relative axial position of the molds once the molds are closed with the tape. If a mistake is made in setting up an appropriate axial positions of the molds, the tape has to be unwrapped and the whole process has to start over again.

In order to overcome these and other disadvantages, a new type of strip is disclosed in U.S. Pat. No. 6,099,764 issued to Su et al., which is incorporated herein by reference for background information only. As disclosed, the strip has a first and an opposed second end, an interior surface and an opposed outer surface, and a recess channel formed on the inside surface extending from the first end to the second end. A fluid lens-forming material can be introduced into a molding cavity through the recess channel by a filling needle. However, the recess channel is formed on the inside surface, and there is no indication on the outer surface as to where the recess channel is located. Thus, one concern is that it may be difficult for a user to properly position the filling needle into the recess channel. The second concern is that portions of the strip at the recess channel are thinner than other parts of the strip, which may affect the strength of the strip. Therefore, there is still a need in the art for new or improved molding method and apparatus.

Additionally, during the molding process, often it needs to transport an optical device such as a mold from one place to another place, or to position the mold at a desired location or position. In doing so, one must be careful not to touch the optical surface of the mold to keep the optical surface of the mold clean so that the quality of optical lenses to be molded from the mold is not compromised. Thus, there is also a need in the art for new or improved apparatus for holding the optical device.

SUMMARY OF THE INVENTION

The present invention overcomes the disadvantages of the prior art and provides several related methods and devices for holding a mold assembly and molding an optical lens using the same. In one aspect, the present invention relates to a method for molding an optical lens using a front mold and a back mold with facing inside surfaces that are a negative image of the surfaces of the optical lens and that are at a proper distance and rotational orientation to each other, wherein each of the front mold and back mold has an edge. In one embodiment, the method includes the step of wrapping a strip around the edges of the front mold and the back mold to form a sleeve. The strip has a body portion that has a first end and an opposed second end, an interior surface and an opposed outer surface, and a first flange and a second flange, and a partially encircled portion defining an elongated channel extending from the first end to the second end, wherein the partially encircled portion is located between the first flange and the second flange and protruding away from the outer surface of the body portion, and the inside surface of the body portion defines an opening therein between the first flange and the second flange in fluid communication with the elongated channel. As formed, the sleeve has a longitudinal axis and a diameter, and cooperates with the front mold and the back mold to define a molding cavity, wherein the molding cavity is in fluid communication with the elongated channel through the opening. Moreover, the method includes the steps of injecting a fluid lens-forming material into the molding cavity through the elongated channel, and curing the fluid lens-forming material to form the optical lens.

In one embodiment, the strip may be made from a nonadhesive plastic film, wherein the nonadhesive plastic film includes an elastomeric material selected from the group of polyurethane, polyvinyl chloride, organosilicon elastomer and thermoplastic rubbers containing a styrene-ethylene-propylene (butylene) block copolymer. The thickness of the non-adhesive plastic film is between 1.0 millimeter and 8.0 millimeter.

The method further includes the steps of securing together in face-to-face engagement of the interior surfaces of the first and second ends of the strip to form the sleeve to close the molding cavity and to form a tail, using the tail as a handler to handle the molds, and using a port, which is formed by the portion of the elongated channel at the first end and the portion of the elongated channel at the second end after the first end and the second end of the strip are secured together in the face-to-face engagement of the interior surface of the first and second ends of the strip, as a venting channel and a passage for establishing a fluid communication to the molding cavity.

In yet another embodiment, the method further includes the step of placing a plug in a direction substantially parallel to the longitudinal axis of the sleeve, across the edges of the front mold and the back mold and between the first end and the second end of the strip before the first end and the second end are secured together to close the molding cavity. The plug can be made from a nonadhesive plastic material that has an elastomeric material selected from the group of polyurethane, polyvinyl chloride, organosilicon elastomer and thermoplastic rubbers containing a styrene-ethylene-propylene (butylene) block copolymer. Moreover, the plug cross-sectionally is triangular. Alternatively, the plug cross-sectionally can take other geometric shapes such as square, oval, circle, etc.

In another aspect, the present invention provides a strip for molding an optical lens. In one embodiment, the strip has a body portion that has a first end and an opposed second end, an interior surface and an opposed outer surface, and a first flange and a second flange, and a partially encircled portion defining an elongated channel extending from the first end to the second end. The partially encircled portion is located between the first flange and the second flange and protruding away from the outer surface of the body portion and the inside surface of the body portion defines an opening therein between the first flange and the second flange in fluid communication with the elongated channel.

In yet another aspect, the present invention provides an apparatus for holding a mold assembly, wherein the mold assembly includes a front mold, a back mold and a strip wrapping around the edges of the front mold and back mold to form a sleeve. The strip has a body portion that has a first end and an opposed second end, an interior surface and an opposed outer surface, and an elongated channel extending from the first end to the second end. As formed, the sleeve has a longitudinal axis and a diameter and cooperating with the front mold and the back mold to define a molding cavity, wherein the molding cavity is in fluid communication with the elongated channel.

In one embodiment, the apparatus includes a first portion and a second portion. The first portion has a top part that has a top surface, an opposite bottom surface, a bore defined therein extending between the top surface and the bottom surface, a bottom part, and a middle part connecting the top part and the bottom part, wherein the middle part includes a base and a holder coupled to the base. The second portion has a top part that has a top surface, an opposite bottom surface, a bore defined therein extending between the top surface and the bottom surface, a bottom part, and a middle part connecting the top part and the bottom part, wherein the middle part includes a base and a holder coupled to the base. The first portion and the second portion are pivotally coupled together at the bottom parts so that the top part of the first portion and the top part of the right portion can be closed to define a housing for receiving the mold assembly therein, wherein the top part of the first portion and the top part of the second portion can also be opened for receiving the mold assembly in the housing.

Moreover, in one embodiment, the holder of the first portion has a body portion that has a top surface, an opposite bottom surface, a rear surface, an opposite front surface, a first side surface and an opposite second side surface, a first arm adjacent the body portion to the first side surface of the body portion, wherein the first arm extends away from the body portion and has a first surface curved for partially receiving the mold assembly, and a second arm adjacent the body portion to the second side surface of the body portion, wherein the second arm extends away from the body portion and has a first surface curved for partially receiving the mold assembly. The first arm and second arm are located opposite to each other across the body portion and define a recess with the body portion. Additionally, the first arm, the second arm and the body portion of the first portion define an opening adjacent to the top surface, wherein the opening is in communication with the bore of the top part of the first portion and the recess of the holder of the first portion.

Likewise, the holder of the second portion has a body portion that has a top surface, an opposite bottom surface, a rear surface, an opposite front surface, a first side surface and an opposite second side surface, a first arm adjacent the body portion to the first side surface of the body portion, wherein the first arm extends away from the body portion and has a first surface curved for partially receiving the mold assembly, and a second arm adjacent the body portion to the second side surface of the body portion, wherein the second arm extends away from the body portion and has a first surface curved for partially receiving the mold assembly. The first arm and second arm are located opposite to each other across the body portion and define a recess with the body portion. Additionally, the first arm, the second arm and the body portion of the second portion further define an opening adjacent to the top surface, wherein the opening is in communication with the bore of the top part of the second portion and the recess of the holder of the second portion.

In yet another aspect, the present invention provides an apparatus for holding a mold, wherein the mold has an optical surface and a second surface opposite the optical surface and is characterized by a radius $R_m$. In one embodiment, the apparatus includes a first ring defining an opening. The first ring has a ring body that has a longitudinal axis, a first surface and an opposite second surface, and an outer surface and an interior surface, wherein the outer surface is characterized by a first radius, $R_1$, and the interior surface is characterized by a second radius, $R_2$, and a plurality of teeth formed on the first surface in a circle and protruding away from the ring body along the longitudinal axis, wherein the circle has a radius, $R_c$, complementary to the radius of the mold $R_m$ to allow the plurality of teeth to receive and hold the mold.

Moreover, the apparatus includes a second ring that has a base, having a first surface and an opposite second surface, a ring body formed on the first surface of the base, the ring body having a longitudinal axis, a top surface, an outer surface and an interior surface, wherein the outer surface is characterized by a first radius, $R'_1$, and the interior surface is characterized by a second radius, $R'_2$, and a plurality of teeth formed on the top surface in a circle and protruding away from the ring body along the longitudinal axis, wherein the circle has a radius, $R'_c$, complementary to the radius of the mold $R_m$, to allow the plurality of teeth to receive and hold the mold.

In a further aspect, the present invention provides a method for holding an optical device such as a mold, wherein the optical device has an optical surface and a second surface opposite the optical surface and is characterized by a radius $R_m$. In one embodiment, the method includes the steps of providing a first ring that has a longitudinal axis and a plurality of teeth formed in a circle, wherein the circle has a radius, $R_c$, complementary to the radius of the optical device, $R_m$, and picking up the optical device with the plurality of teeth towards the second surface of the optical device to receive and hold the optical device so that the optical surface of the optical device is facing away from the first ring. The method further includes the steps of providing a second ring that has a longitudinal axis and a plurality of teeth formed in a circle, wherein the circle has a radius, $R'_c$, complementary to the radius of the mold, $R_m$, directing the optical device so that the optical surface of the optical device is facing the second ring, and the first ring and the second ring are co-axial, pushing the first ring towards the second ring so that the second ring receives and holds the optical device with the optical surface of the optical device facing towards to the second ring, and removing the first ring from the optical device. The method further includes the step of rotating the second ring in a relative motion so as to position the optical device at a desired orientation. The optical device can be an optical lens having at least one optical surface, or a mold that can be used to produce an optical lens.

In yet another aspect, the present invention provides an apparatus for holding a mold, wherein the mold has an optical surface and a second surface opposite the optical surface and is characterized by a radius $R_m$. In one embodiment, the apparatus has a first ring that has a longitudinal axis and a plurality of teeth formed in a circle, wherein the circle has a radius, $R_c$, complementary to the radius of the optical device $R_m$, means for picking up the optical device so that the optical surface of the optical device is facing away from the first ring, a second ring that has a longitudinal axis and a plurality of teeth formed in a circle, wherein the circle has a radius, $R'_c$, complementary to the radius of the optical device $R_m$, means for directing the optical device so that the optical surface of the optical device facing the second ring and the first ring and the second ring are co-axial, means for pushing the first ring towards the second ring so that the second ring receives and holds the optical device with the optical surface of the optical device facing towards to the second ring, and means for removing the first ring from the optical device. The apparatus further includes means for rotating the second ring in a relative motion so as to position the optical device at a desired orientation. Likewise, the optical device can be an optical lens having at least one optical surface, or a mold that can be used to produce an optical lens.

These and other aspects will become apparent from the following description of the various embodiments taken in conjunction with the following drawings, although variations and modifications may be effected without departing from the spirit and scope of the novel concepts of the disclosure.

DETAILED DESCRIPTION OF THE INVENTION

The present invention is more particularly described in the following examples that are intended as illustrative only since numerous modifications and variations therein will be apparent to those skilled in the art. As used in the specification and in the claims, "a" can mean one or more, depending upon the context in which it is used. Several embodiments are now described with reference to the figures, in which like numbers indicate like parts throughout the figures. Subtitles, if any, are provided for helping a reader to understand various embodiments and are not intended to limit upon the scope of the invention.

Referring first generally to FIGS. 1–6, in one aspect, the present invention relates to a method for molding an optical lens. In one embodiment, the method is practiced by using a front mold 12 and a back mold 14 whose facing inside surfaces are a negative image of the surfaces of the optical lens 10 at a proper distance and rotational orientation to each other. The front mold 12 and back mold 14 each has an edge 13, 15, respectively.

Figures 1, 1A, 1B:
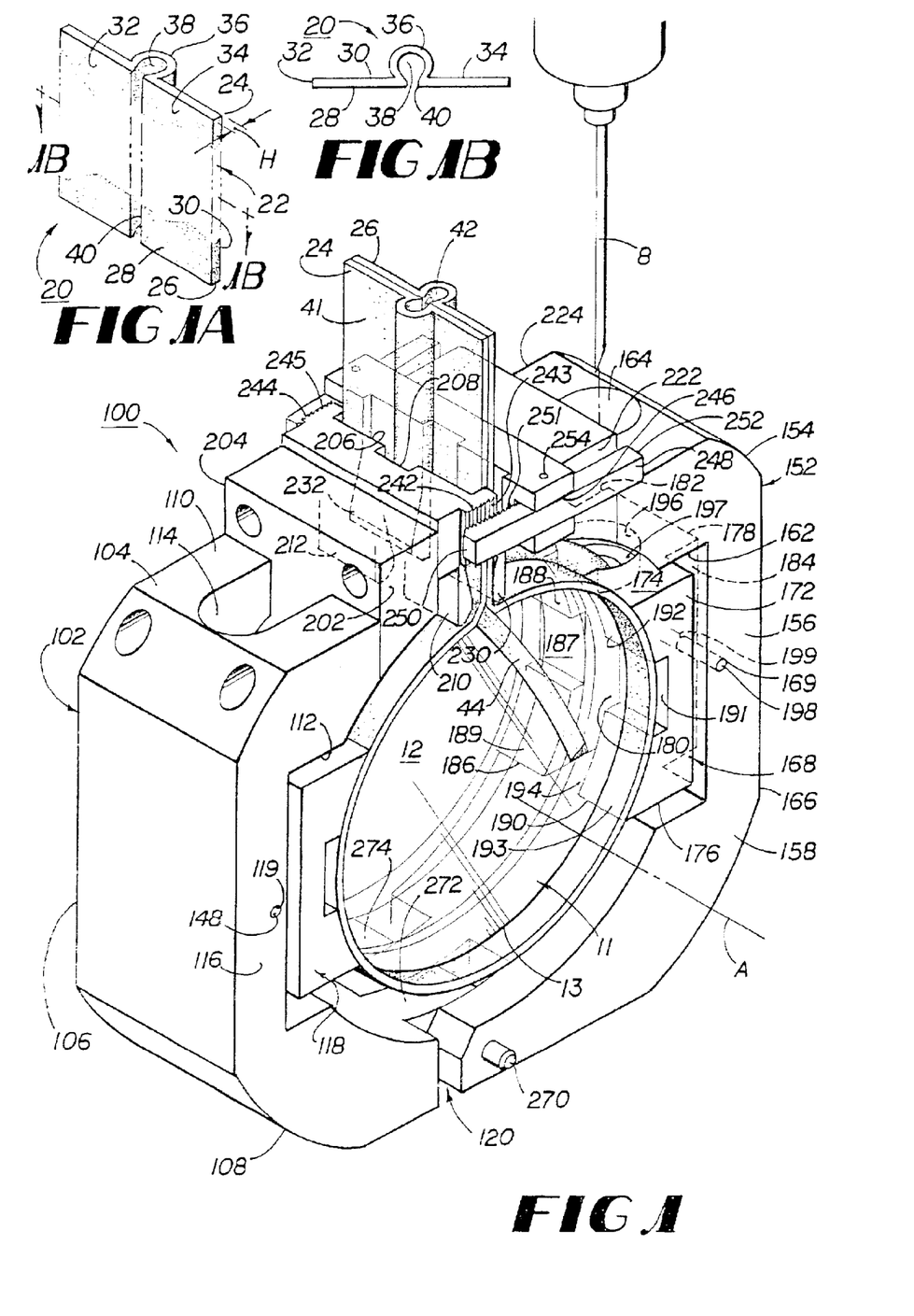
FIG. 1 is a perspective view of a holding device according to the present invention.
FIG. 1A is a perspective view of a strip for forming a mold assembly according to one embodiment of the present invention.
FIG. 1B is a cross-sectional view of the strip of FIG. 1A.

The method is also practiced by a strip 20 that has a body portion 22 that has a first end 24 and an opposed second end 26, an interior surface 28 and an opposed outer surface 30, and a first flange 32 and a second flange 34, and a partially encircled portion 36 defining an elongated channel 38 extending from the first end 24 to the second end 26. The partially encircled portion 36 is located between the first flange 32 and the second flange 34. The partially encircled portion 36 is protruding away from the outer surface 30 of the body portion 22. Additionally, the partially encircled portion 36 has an opening 40 formed on the interior surface 28 of the body portion 22 between the first flange 32 and the second flange 34 in fluid communication with the elongated channel 38.

In one embodiment, the strip 20 can be wrapped around the edges 13, 15 of the front mold 12 and back mold 14 with the strip 20 to form a sleeve 50. In doing so, the strip 20 can be wrapped around the edges 13, 15 of the front mold 12 and back mold 14 such that the interior surface 28 of the strip 20 is in direct contact with the edges 13, 15 of the front mold 12 and back mold 14. The formed sleeve 50 has a longitudinal axis A, and a diameter and cooperates with the front mold 12 and the back mold 14 to define a molding cavity 16. The molding cavity 16 is in fluid communication with the elongated channel 38 through the opening 40. The front mold 12 and back mold 14 and the sleeve 50 form a lens-forming assembly or mold assembly 11. A fluid lens-forming material can be injected into the molding cavity 16 through the elongated channel 38 and can then be cured to form the optical lens 10.

One aspect of the sleeve 20 of the present invention is the sleeve material. In one embodiment, a desirable characteristic is that the sleeve material is nonadhesive at least at where the interior surface 28 is formed, so that it does not entirely prohibit the axial movement of the molds 12, 14. Moreover, the sleeve material is relatively soft, so that it can be wrapped around against the edges of the molds 12, 14 to form the sleeve 50. Furthermore, the sleeve material is elastomeric, so that once the sleeve 50 is formed and the front mold 12 and back mold 14 are contained within the sleeve 50, the tension of the elastomeric material forces the sleeve 50 tightly against the edges of the molds 12, 14 along the radial axis. Still another aspect of the sleeve material is that it is chemically compatible with the lens-forming fluid to avoid inhibiting polymerization of the fluid. Another aspect of the sleeve material is that it is relatively thick so that it can sustain the tension force.

As shown in FIG. 1A, the strip 20 has a thickness H between the interior and outer surfaces 28 and 30. The range of thickness H is from 1 millimeter to 8 millimeter, preferably 2 millimeter to 6 millimeter and optimally 3 millimeter to 4 millimeter. Note that the thickness of the encircled portion 36 is not significantly thinner than that of the other parts of the strip 20. Indeed, in one embodiment as shown in FIG. 1A, they are substantially the same so that the strength of the strip 20 is substantially uniform.

In one embodiment, a suitable sleeve material is thermoplastic rubber that contains KRATON®G, a styrene-ethylene-propylene (butylene) block copolymer, sold by Shell Oil Company® of Houston, Tex. Such rubber includes those sold under the trade names DYNAFLEX®G2703, 2711, and 2712 by GLS Corporation of Cary, Ill. These rubbers have a Shore A hardness ranging from about 43 to 62, a specific gravity of about 0.9 g/cc, a tensile modulus at 300% elongation ranging from about 355 to 470, tensile strength at break of about 680 to 1000 psi, and a tear strength of about 113 to 127. These rubbers have smooth surfaces and have a thickness in a range of 1 mm–8 mm. The sleeve material of single material. In fact, the desired sleeve material can be dependent on the specific monomer compound used to form the lens. That is, a certain sleeve material may be utilized with a particular lens-forming fluid and different type of sleeve material with another lens material. Among many available materials, it is found that the present invention can be satisfactorily practiced with polyurethane, polyvinyl chloride, organosilicon elastomer as well as KRATON®G and thermoplastic rubbers containing a styrene-ethylene-propylene (butylene) block copolymer.

The first and second ends 24, 26 of the strip 20 can be secured together in face-to-face engagement of the interior surfaces of the first end 24 and the second end 26 to close the molding cavity 16 and form a tail 41. The tail 41 may function as a handler to handle the molds 12, 14. Additionally, a port 42 is formed by the portion of the elongated channel 38 at the first end 24 and the portion of the elongated channel 38 at the second end 26 after the first end 24 and the second end 26 of the strip 20 are fastened together. The port 42 can be used as a venting channel and a passage for establishing a fluid communication to the molding cavity 16.

Figure 2:
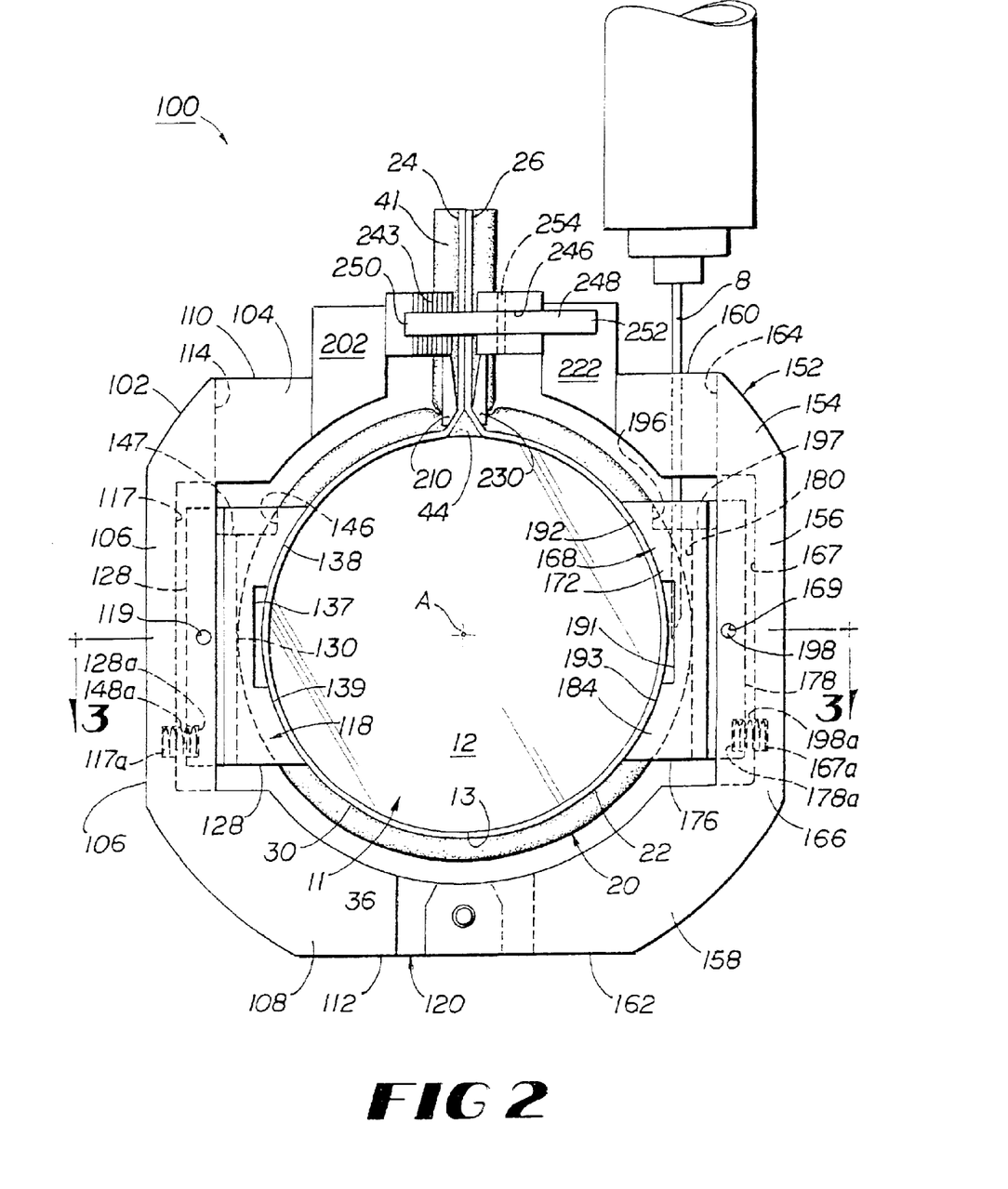
FIG. 2 is a vertical cross-sectional view of part of the holding device as shown in FIG. 1.

In yet another embodiment, a plug 44 can be placed in a direction substantially parallel to the longitudinal axis A, across the edges 13, 15 of the front mold 12 and the back mold 14 and between the first end 24 and the second end 26 of the strip 20 before the first end 24 and the second end 26 of the strip 20 are fastened together to close the molding cavity 16. The plug 44 can be made from a nonadhesive plastic material. The nonadhesive plastic material includes an elastomeric material selected from the group of polyurethane, polyvinyl chloride, organosilicon elastomer and thermoplastic rubbers containing a styrene-ethylene-propylene (butylene) block copolymer. Alternatively, the plug 44 can be made form metal, alloy, ceramic material, plastic material, glass, or the like. Cross-sectionally, the plug 44 can take various geometric shapes such as round, oval, triangular, rectangular, square, etc. In the embodiment as shown in FIGS. 1 and 2, the plug 44 is triangular.

By utilizing the plug 44 in the manner as described above, any unfilled spaces created between the interior surfaces of the strip 20 and the edges of the edges 13, 15 of the front mold 12 and the back mold 14 when the first end 24 and the second end 26 of the strip 20 are fastened together to close the molding cavity 16 can be substantially filled by the plug 44, which not only substantially blocks potential spill-over of the fluid lens-forming material from the molding cavity 16 but as a cushion allows the strip 20 to tightly wrap around the edges 13, 15 of the front mold 12 and the back mold 14. Alternatively, the present invention can also be practiced without the plug 44.

As formed, the mold assembly 11 can be processed at an assembly station such as one disclosed in U.S. Pat. No. 6,099,764, which is incorporated herein by reference for background information only. Other assembly devices can be used to process the lens forming assembly. In particular, simple and inexpensive holding devices that can hold and process the mold assembly 11 are needed for on site lens making.

In one aspect, the present invention provides such an apparatus or holding device 100 for holding the mold assembly 100. In one embodiment, the holding device 100 includes a first portion 102 and a second portion 152. The first portion 102 includes a top part 104 that has a top surface 110, an opposite bottom surface 112, a bore 114 defined therein extending between the top surface 110 and the bottom surface 112. The first portion 102 further includes a bottom part 108, and a middle part 106 connecting the top part 104 and the bottom part 108. The middle part 106 includes a base 116 and a holder 118 coupled to the base 116. The second portion 152 includes a top part 154 that has a top surface 160, an opposite bottom surface 162, a bore 164 defined therein extending between the top surface 160 and the bottom surface 162. The second portion 152 further includes a bottom part 158, and a middle part 156 connecting the top part 154 and the bottom part 158. The middle part 156 includes a base 166 and a holder 168 coupled to the base 166. The first portion 102 and the second portion 152 are pivotally coupled together at the bottom parts 108, 158 so that the top part 104 of the first portion 102 and the top part 154 of the second portion 152 can be closed to define a housing 120 for receiving the mold assembly 11 therein. The top part 104 of the first portion 102 and the top part 154 of the second portion 152 can also be opened for receiving in or removing away the mold assembly 11 from the housing 120, respectively.

Figures 2A, 2B, 2C:
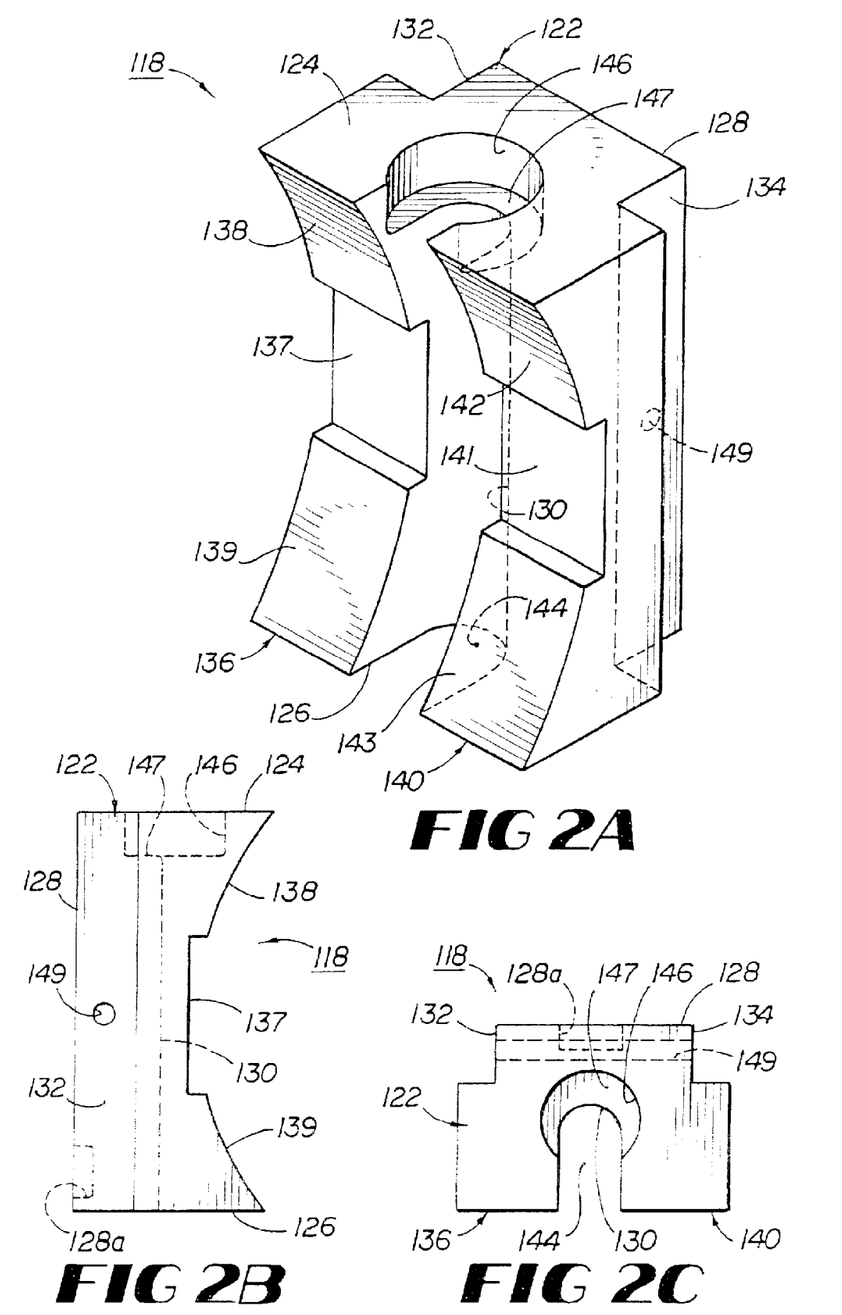
FIG. 2A is a perspective view of a holder that can be utilized in the holding device of FIG. 1 according to one embodiment of the present invention.
FIG. 2B is a side view of the holder as shown in FIG. 2A.
FIG. 2C a top view of the holder as shown in FIG. 2A.

Moreover, in one embodiment as shown in FIGS. 2A–2C, the holder 118 of the first portion 102 has a body portion 122. The body portion 122 has a top surface 124, an opposite bottom surface 126, a rear surface 128, an opposite front surface 130, and a first side surface 132 and an opposite second side surface 134. The holder 118 further has a first arm 136 and a second arm 140. The first arm 136 is adjacent to the first side surface 132 of the body portion 122, extends away from the body portion 122 and has a first surface 138 curved for partially receiving the mold assembly 11. The second arm 140 is adjacent to the second side surface 134 of the body portion 122, extends away from the body portion 122 and has a first surface 142 curved for partially receiving the mold assembly 11. The first arm 136 and second arm 140 are located opposite to each other across the body portion 122 and define a recess 144 in cooperation with the body portion 122.

Furthermore, the first arm 136, the second arm 140 and the body portion 122 in cooperation define an opening 146 adjacent to the top surface 124. The opening 146 is in communication with the bore 114 of the top part 104 of the first portion 102 and the recess 144 of the holder 118 of the first portion 102. The body portion 122 additionally has an edge 147 that is formed on the front surface 130, at which the opening 146 and the recess 144 merge. The first arm 136 has a second surface 139 curved for partially receiving the mold assembly 11. The first curved surface 138 and the second curved surface 139 have substantially same curvature complementary to the edges 13, 15 of the front mold 12 and the back mold 14. As best shown in FIG. 2A, the first curved surface 138 and the second curved surface 139 are located apart from each other thereby defining a recess 137 therebetween. The base 116 of the middle part 106 has a groove 117, as shown in FIG. 3, which is sized to complementarily receive part of the body portion 122 of the holder 118 therein.

Figure 3:
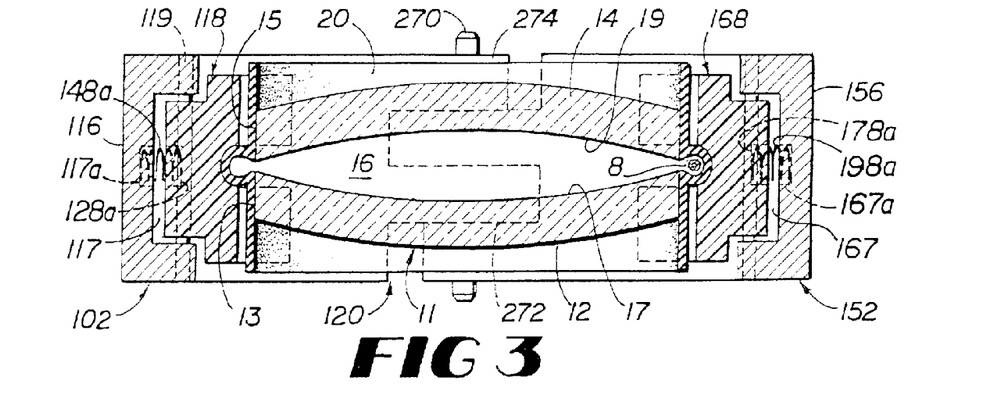
FIG. 3 is a cross-sectional view of the holding device as shown in FIG. 2.
Figure 4:
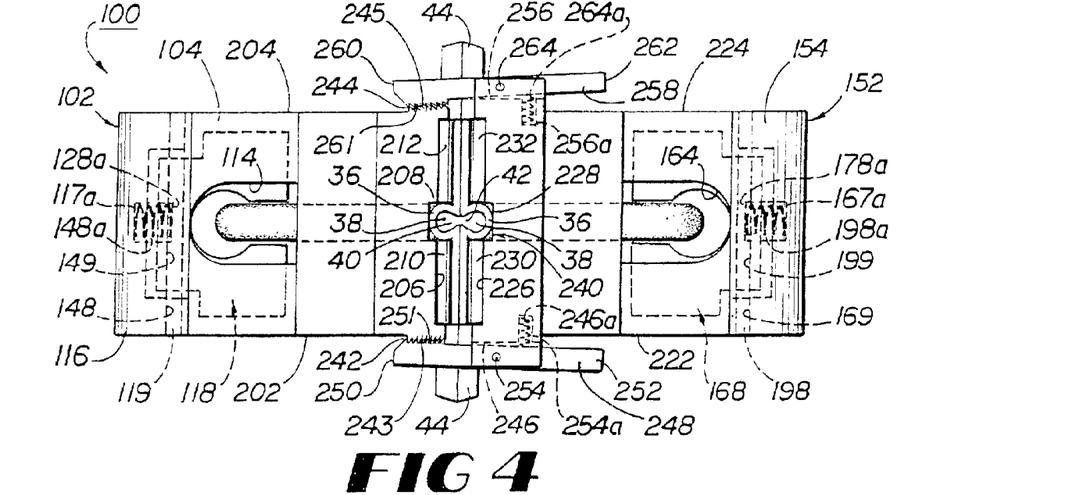
FIG. 4 is a top view of the holding device as shown in FIG. 3.

Referring to FIGS. 1, 3 and 4, the body portion 122 has a pinch hole 149 extending from the first side surface 132 to the second side surface 134. Additionally, the base 116 of the middle part 106 has a pinch hole 119 complementary, position wise and size wise, to the pinch hole 149 of the body portion 122 of the holder 118. Moreover, the middle part 106 has a pinch 148 placed in both the pinch hole 149 of the body portion 122 of the holder 118 and the pinch hole 119 of the base 116 so as to couple the base 116 and the holder 118 together and allow the holder 118 to be partially received in the groove 117 of the base 116. As such coupled, the holder 118 is slightly rotatable about the pinch 148 therein. Optionally, an elastic member 148a such as a spring can be utilized to facilitate the coupling of the base 116 and the holder 118. In one embodiment, the elastic member 148a is received in a recess 117a in the groove 117 of the base 116 and a complementary recess 128a in the rear surface 128 of the body portion 122.

Additionally, the holder 168 of the second portion 152 is substantially identical to the holder 118 of the first portion 102 in term of the structure. That is, the holder 168 has a body portion 172. The body portion 172 has a top surface 174, an opposite bottom surface 176, a rear surface 178, an opposite front surface 180, and a first side surface 182 and an opposite second side surface 184. The holder 168 further has a first arm 186 and a second arm 190. The first arm 186 is adjacent to the first side surface 182 of the body portion 172, extends away from the body portion 172 and has a first surface 188 curved for partially receiving the mold assembly 11. The second arm 190 is adjacent to the second side surface 184 of the body portion 172, extends away from the body portion 172 and has a first surface 192 curved for partially receiving the mold assembly 11. The first arm 186 and second arm 190 are located opposite to each other across the body portion 172 and define a recess 194 in cooperation with the body portion 172.

Furthermore, the first arm 186, the second arm 190 and the body portion 172 in cooperation define an opening 196 adjacent to the top surface 174. The opening 196 is in communication with the bore 164 of the top part 154 of the first portion 152 and the recess 194 of the holder 168 of the first portion 152. The body portion 172 additionally has an edge 197 that is formed on the front surface 180, at which the opening 196 and the recess 194 merge. The first arm 186 has a second surface 189 curved for partially receiving the mold assembly 11. The first curved surface 188 and the second curved surface 189 have substantially same curvature complementary to the edges 13, 15 of the front mold 12 and the back mold 14. As best shown in FIG. 1, the first curved surface 188 and the second curved surface 189 are located apart from each other thereby defining a recess 187 therebetween. The base 166 of the middle part 156 has a groove 167, as shown in FIG. 3, which is sized to complementarily receive part of the body portion 172 of the holder 168 therein.

Referring to FIGS. 1, 3 and 4, the body portion 172 has a pinch hole 199 extending from the first side surface 182 to the second side surface 184. Additionally, the base 166 of the middle part 156 has a pinch hole 169 complementary, position wise and size wise, to the pinch hole 199 of the body portion 172 of the holder 168. Moreover, the middle part 156 has a pinch 198 placed in both the pinch hole 199 of the body portion 172 of the holder 168 and the pinch hole 169 of the base 166 so as to couple the base 166 and the holder 168 together and allow the holder 168 to be partially received in the groove 167 of the base 166. As such coupled, the holder 168 is slightly rotatable about the pinch 198 therein. Optionally, an elastic member 198a such as a spring can be utilized to facilitate the coupling of the base 166 and the holder 168. In one embodiment, the elastic member 198a is received in a recess 167a in the groove 167 of the base 166 and a complementary recess 178a in the rear surface 178 of the body portion 172.

Referring now to FIGS. 1 and 4, the top part 104 of the first portion 102 has a first side surface 202, an opposite second side surface 204, and a contact side surface 206 connecting the first side surface 202 and the second side surface 204. A groove 208 is formed on the contact side surface 206. Projections 210, 212 are extending from the contact side surface 206 away from the bottom surface 112 of the top part 104. Likewise, the top part 154 of the second portion 152 has a first side surface 222, an opposite second side surface 224, and a contact side surface 226 connecting the first side surface 222 and the second side surface 224. A groove 228 is formed on the contact side surface 226, which is complementary, position wise and size wise, to the groove 208 formed on the contact side surface 206 of the first portion 102. Projections 230, 232 are extending from the contact side surface 226 away from the bottom surface 162 of the top part 154. Projections 230, 232 are complementary, position wise and size wise, to the projections 210, 212 of the first portion 102, respectively, so that when the top part 104 of the first portion 102 and the top part 154 of the second portion 152 are closed to define the housing 120 for receiving the mold assembly 11 therein, the projection 210 (or the projection 212 or both) formed on the contact side surface 202 of the first portion 102 and the projection 230 (or the projection 232 or both) formed on the contact side surface 226 of the second portion 152 contact each other, respectively, and the groove 208 formed on the contact side surface 206 of the first portion 102 and the groove 228 formed on the contact side surface 226 of the second portion 152 form an opening 240. The opening 240 is sized such as to allow the tail 41 of the molding assembly 11 to pass through as shown in FIG. 1. Note that while a two-projection (e.g., 210, 212 of the first portion 102) configuration for each top part is utilized in one embodiment as discussed above, the present invention can be practiced with other alternative configurations. For instance, each top part may just have one projection, or three or more projections.

The top part 104 of the first portion 102 further has an edge 242 with toothed surface 243 positioned on the first side surface 202. Additionally, the top part 104 of the first portion 102 has an edge 244 with toothed surface 245 positioned on the second side surface 204. Correspondingly, the top part 154 of the second portion 152 has a groove 246 positioned on the first side surface 222. A close pin 248 is received partially in the groove 246 on the first side surface 222, wherein the close pin 248 has a first end 250 with teeth 251 complimentary to the toothed surface 243 of the edge 242 on the first side surface 202 and a second end 252 opposite the first end 250. The top part 154 of the second portion 152 further has a connecting pin 254 that penetrates the groove 246 through portions of the top part 154 and the close pin 248. In this embodiment, the close pin 248 is pivotally attached to the top part 154 of the second portion 152 through the connecting pin 254 so that when the second end 252 of the close pin 248 is pushed in a first direction, say, toward to the first side surface 222, the first end 250 of the close pin 248 moves in an opposite second direction, i.e., away from the first side surface 222, to allow the teeth 251 to disengage the toothed surface 243. Optionally, an elastic member 254a such as a spring can be utilized to facilitate the coupling of the close pin 248 with the top part 154 of the second portion 152. In one embodiment, the elastic member 254a is attached to the close pin 248 at one end and received in a recess 246a in the groove 246 at the other end.

Additionally, the top part 154 of the second portion 152 can have a groove 256 positioned on the second side surface 224. A close pin 258 is received partially in the groove 256 on the second side surface 224, wherein the close pin 258 has a first end 260 with teeth 261 complimentary to the toothed surface 245 of the edge 244 on the second side surface 222 and a second end 262 opposite the first end 260. The top part 154 of the second portion 152 further has a connecting pin 264 that penetrates the groove 256 through portions of the top part 154 and the close pin 258. In this embodiment, the close pin 258 is pivotally attached to the top part of the second portion through the connecting pin 264 so that when the second end 262 of the close pin 258 is pushed in a first direction, say, toward to the second side surface 224, the first end 260 of the close pin 258 moves in an opposite second direction, i.e., away from the second side surface 224, to allow the teeth 261 to disengage the toothed surface 245. Optionally, an elastic member 264a such as a spring can be utilized to facilitate the coupling of the close pin 258 with the top part 154 of the second portion 152. In one embodiment, the elastic member 264a is attached to the close pin 258 at one end and received in a recess 256a in the groove 256 at the other end.

Figure 5:
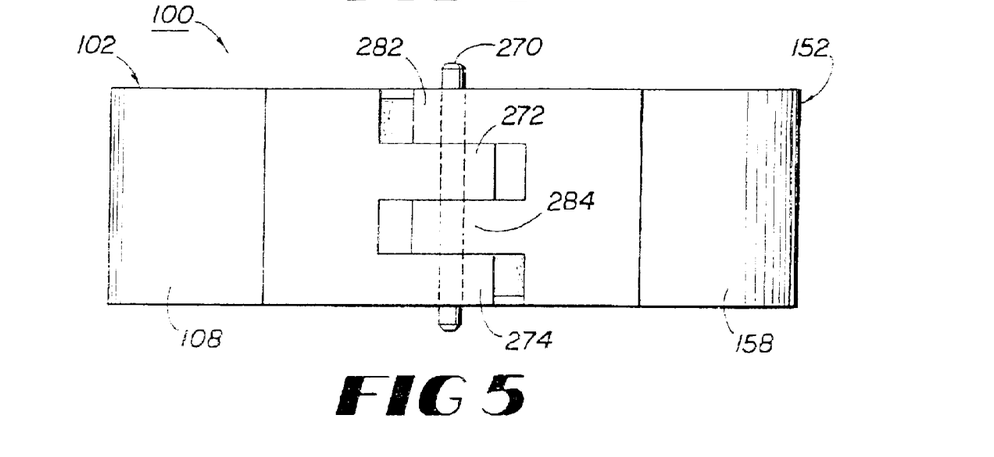
FIG. 5 is a bottom view of the holding device as shown in FIG. 3.

Referring now to FIGS. 1 and 5, a position pin 270 pivotally couples the bottom parts 108, 158 of the first and second portions 102, 152 together. In one embodiment, the bottom part 108 of the first portion 102 has a first leg 272 and a second leg 274 defining a space therebetween. Correspondingly, the bottom part 158 of the second portion 152 has a first leg 282 and a second leg 284 defining a space therebetween. The first leg 282 and the second leg 284 of the bottom part 158 of the second portion 152 are complimentary, position wise and size wise, to the first leg 272 and the second leg 274 of the bottom part 108 of the first portion 102 to allow the second leg 284 of the bottom part 158 of the second portion 152 to be received in the space between the first leg 272 and the second leg 274 of the bottom part 108 of the first portion 102, and the first leg 272 of the bottom part 108 of the first portion 102 to be received in the space between the first leg 282 and the second leg 284 of the bottom part 158 of the second portion 152. Other coupling mechanisms can also be utilized. For example, each bottom part may just have one leg and be coupled together through a position pin.

Figure 6:
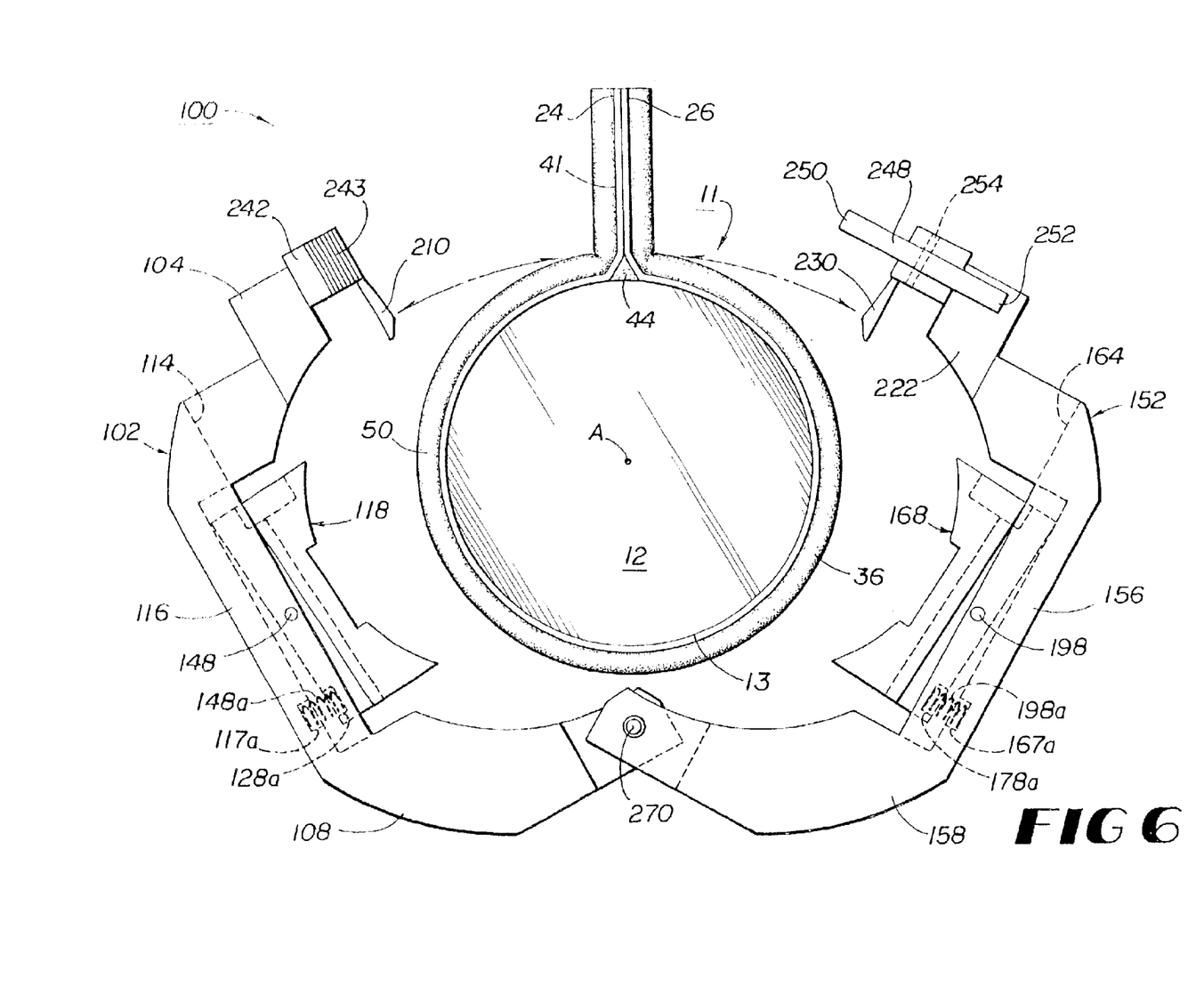
FIG. 6 schematically shows that the holding device of FIG. 1 is in an opened position to receive a molding assembly according to one embodiment of the present invention

In operation, as shown in FIG. 6, the holding device 100 is opened to receive the mold assembly 11. Then the first portion 102 and the second portion 152 of the holding device 100 are closed so that the molding assembly 11 is received in the housing 120 with the tail 41 to pass through the opening 240 as shown in FIGS. 1 and 4. Close pins 248, 258 engage with the toothed surfaces 243, 245, respectively, to keep the molding assembly 11 properly positioned in the holding device 100. In this configuration, the port 42 is in fluid communication with the molding cavity 16 and the ambient air. In this regard, it is noted that the plug 44 should be sized not to completely block the fluid communication between the port 42 and the molding cavity 16. The bore 114 of the top part 104 of the first portion 102 is sized to allow a fluid injecting means such as an injecting or filling needle 8 to pass through to reach the mold assembly 11. Likewise, the bore 164 of the top part 154 of the second portion 152 is sized to allow a fluid injecting means such as the filling needle 8 to pass through to reach the mold assembly. In the configuration shown in FIGS. 1 and 2, the filling needle 8, which may further be in fluid communication with a supply of fluid lens forming material (not shown), passes through the bore 164 of the top part 154 of the second portion 152, reaches the mold assembly 11, pierces through the sleeve 50 at a position along the encircled portion 36 of the strip 20 so as to establish a fluid communication with the molding cavity 16 through the channel 38, and then fills the molding cavity 16 with the fluid lens-forming material. Because the encircled portion 36 of the strip 20 protrudes away from the outer surface 30 of the strip 20, it provides an easier target for the filling needle 8 to penetrate than what prior art can offer. Once a proper amount of the fluid lens-forming material is introduced into the cavity 16, the filling needle 8 withdraws from the cavity 16 and the sleeve 50. The elastomeric character of the sleeve 50 insures that no unnecessary air is introduced into and no fluid lens-forming material escapes from the cavity 16. The fluid lens-forming material is then cured and hardened. Note that to speed up the filling process, multiple filling needles may be utilized through the bores 114, 164.

As one skilled in the art will appreciate, curing can be accomplished in a number of ways. For example, the curing method of the present invention involves exposing the fluid lens-forming material first a microwave radiation for a desired time and then to an ultraviolet ("UV") light for a desired time. Alternatively, after exposing the fluid lens-forming material to UV light, the fluid lens-forming material is then heated for a predetermined time, such as in an infra-red ("IR") oven. The second heating step solidifies the fluid lens-forming material to form the hardened lens if not sufficiently cured in the UV step.

During the curing process, the volume of the fluid lens-forming material shrinks approximately ten to fifteen percent. To compensate the shrinkage, the molds 12, 14 may slide axially along the sleeve 50. As a result, the stresses within the lens are reduced and thus a better lens is produced. The molds in the prior art T-gasket, in contrast, remain stationary, regardless of the stresses from shrinkage, while the molds in the prior-art tape arrangement drag the tape or strip to make it crumple or wrinkle. The venting to the ambient air can be accomplished through the port 42.

Thereafter, the holding device 100 can be opened, and the molding assembly 11 can be disassembled, for example, by simply tearing off the sleeve 50, to obtain the optical lens, which can be further processed.

During the molding process, often it needs to transport an optical device such as a mold from one place to another place, or to position the optical device at a desired location or position. In doing so, one must be careful not to touch the optical surface of the mold to keep the optical surface of the mold clean so that the quality of optical lenses to be molded from the mold is not compromised. As used here referring to a mold, the term "optical surface" refers to a surface of the mold that has proper geometric shape and optical characteristics and will be in direct contact with the liquid lens-forming material to produce a desired optical lens. For example, as shown in FIG. 3, the mold 12 has an optical surface 17, and the mold 14 has an optical surface 19. The optical surface 17 and the optical surface 19 are facing to each other defining the molding cavity 16 to produce a desired optical lens.

Figure 7:
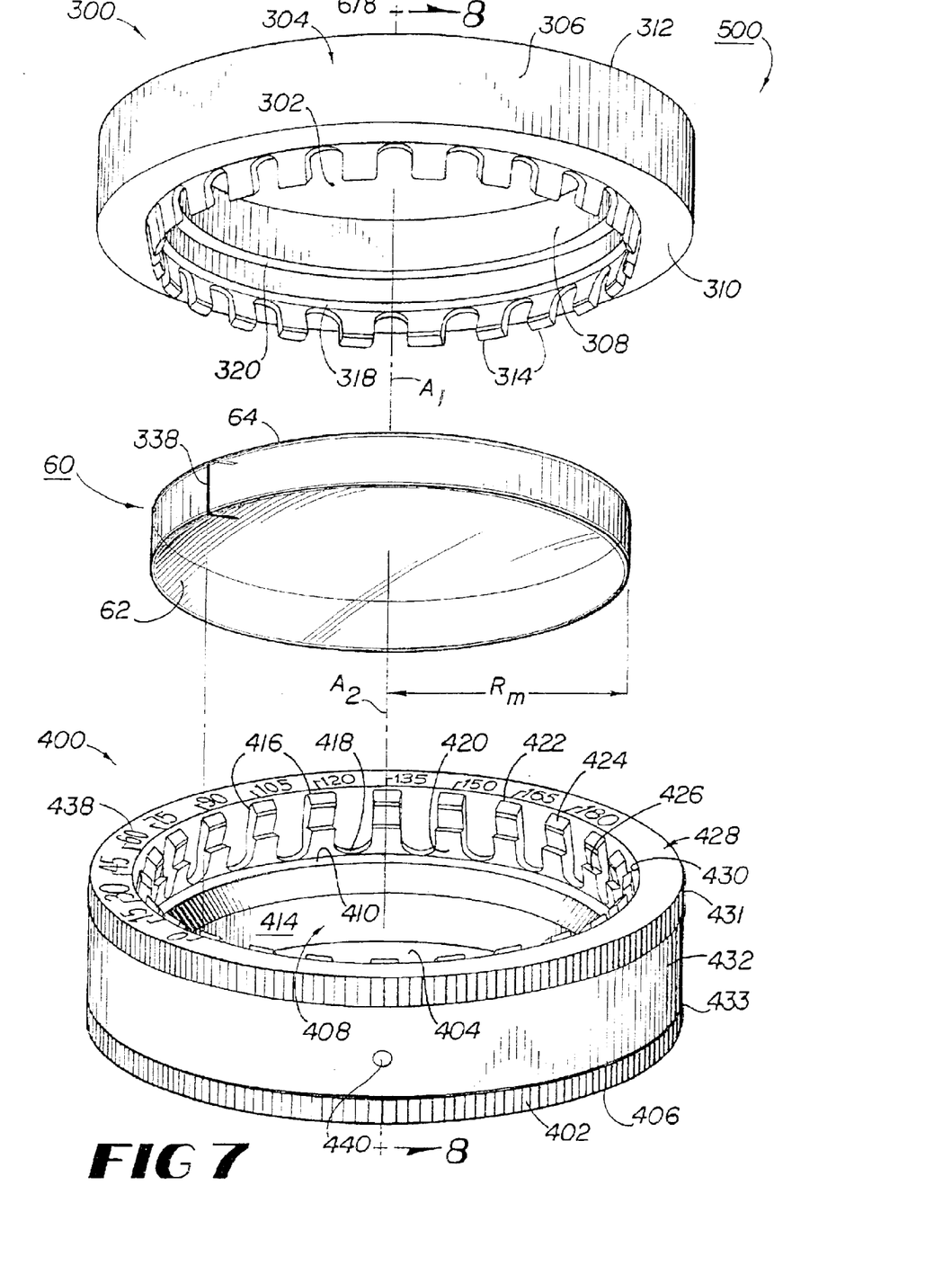
FIG. 7 is a perspective view of an apparatus for holding a mold according to one embodiment of the present invention.

In another aspect, the present invention provides an apparatus 500 for holding a mold such as mold 60 shown in FIG. 7, wherein the mold 60 has an optical surface 62 and a second surface 64 opposite the optical surface 62 and is characterized by a radius $R_m$.

In one embodiment, referring generally now to FIGS. 7–10, the apparatus 500 includes a first ring 300. The first ring 300 defines an opening 302 and a ring body 304. The ring body 304 has a longitudinal axis $A_1$, a first surface 310 and an opposite second surface 312, and an outer surface 306 and an interior surface 308. The outer surface 306 is characterized by a first radius, $R_1$, and the interior surface 308 is characterized by a second radius, $R_2$. Moreover, a plurality of teeth 314 are formed on the first surface 310 in a circle 316 and protruding away from the ring body 304 along the longitudinal axis $A_1$. The circle 316 is characterized by a radius, $R_c$, which is complementary to the radius of the mold 60, $R_m$, to allow the plurality of teeth 314 to receive and hold the mold 60.

The radii of the mold 60 and the circle 316 generally satisfy the following relationship: $R_c \geq R_m$. The radii of the outer surface 306 and the interior surface 308 of the ring body 304, the mold 60 and the circle 316 generally satisfy the following relationship: $R_1 \geq R_c \geq R_m \geq R_2$.

Additionally, the first ring 300 has an optional step 318 formed on the first surface 310 adjacent to the plurality of teeth 314 and extending inwardly from the plurality of teeth 314 toward the longitudinal axis $A_1$ for receiving the mold 60 and supporting the mold 60 therein. The step 318 has a substantially ring-like structure and is characterized by a radius $R_s$ that satisfies the following relationship: $R_c \geq R_s \geq R_2$. Note that while the step 318 provides further support to the mold 60 received therein, it is not necessary to have the step 318 in the first ring 300 because the plurality of teeth 314 can adequately receive and hold the mold 60. Moreover, the first ring 300 has an edge 320 formed on the ring body 304 between the interior surface 308 of the ring body 304 and the step 318.

The plurality of teeth 314 can be formed with elastic materials such as plastics, metals or like such as NORYL, a plastic material sold by GE Plastics, DELRIN, a plastic material sold by Du Pont, or may be other plastic materials such as polypropylene. Each of the plurality of teeth 314 has a width, a thickness, and a length. The width, the thickness and the length of each of the plurality of teeth 314 are in the range of 0.1 cm to 2.0 cm, 0.01 cm to 0.5 cm, and 0.1 cm to 2.0 cm, respectively. There is no requirement for the total number of the plurality of teeth 314. In general, the number of the plurality of teeth 314 is a number no smaller than 2. However, in an extreme case, the plurality of teeth 314 can be merged together to form a unified ring, which is an alternative embodiment of the present invention and the number of the plurality of teeth 314 is one for this alternative embodiment. The plurality of teeth 314 can be substantially identical to, or different from, each other. The plurality of teeth 314 can be uniformly, or non-uniformly, distributed along the circle 316. Different parts of the first ring 300 can be made from same material, or different materials. In the embodiment as shown in FIGS. 7–10, the first ring 300 is manufactured by molding and made from a plastic material such as NORYL, a plastic material sold by GE Plastics, DELRIN, a plastic material sold by Du Pont, or may be other plastic materials such as polypropylene.

Figure 8:
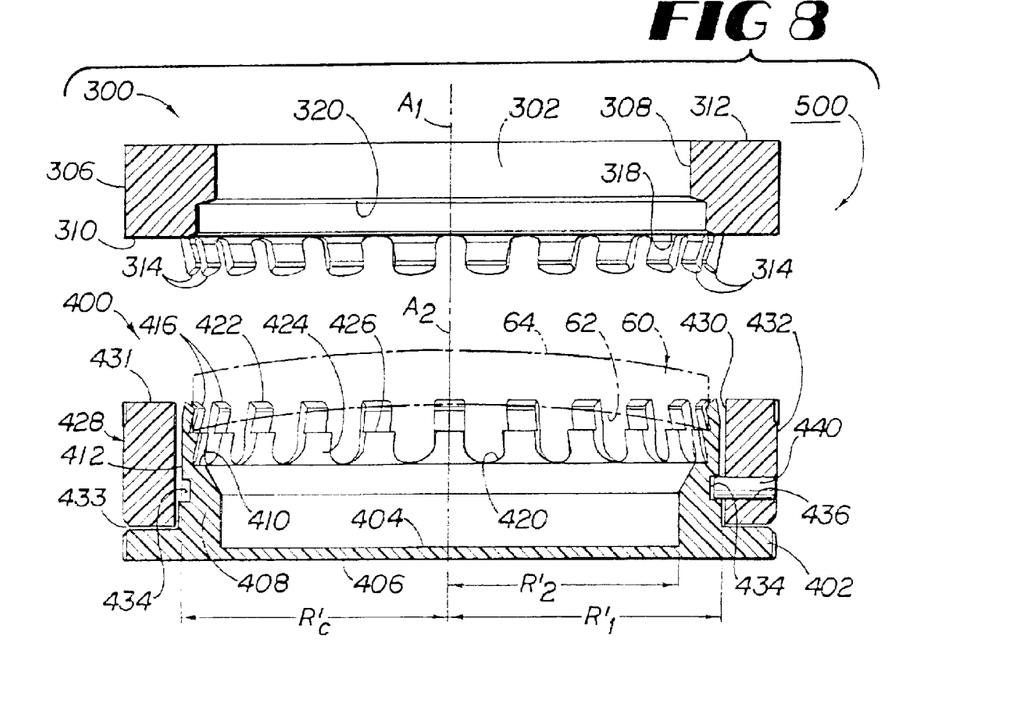
FIG. 8 is a side view of the holding apparatus as shown in FIG. 7.
Figure 9:
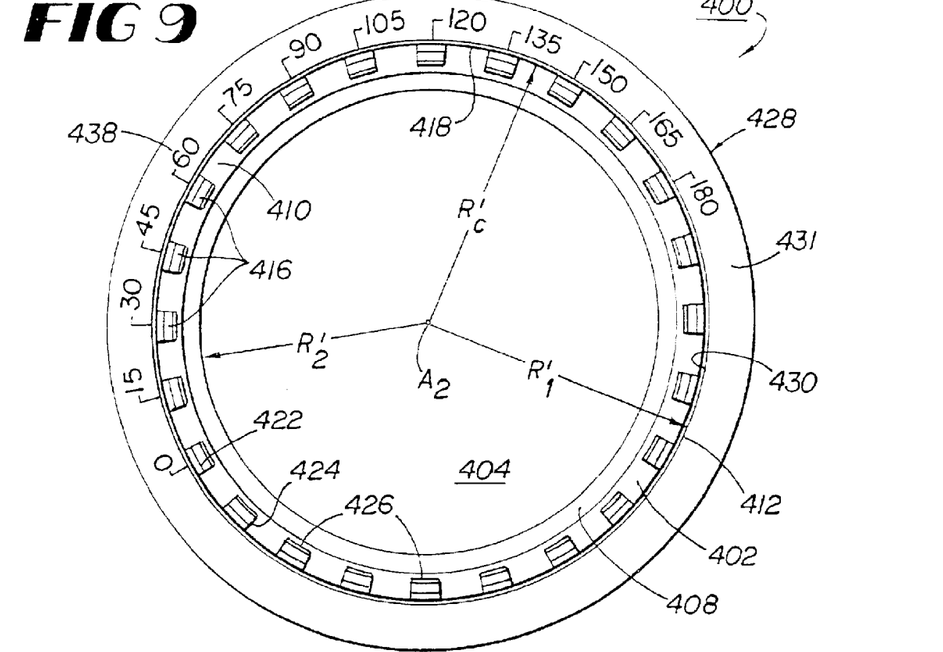
FIG. 9 is a top view of a second ring of the holding apparatus as shown in FIG. 8.
Figure 10:
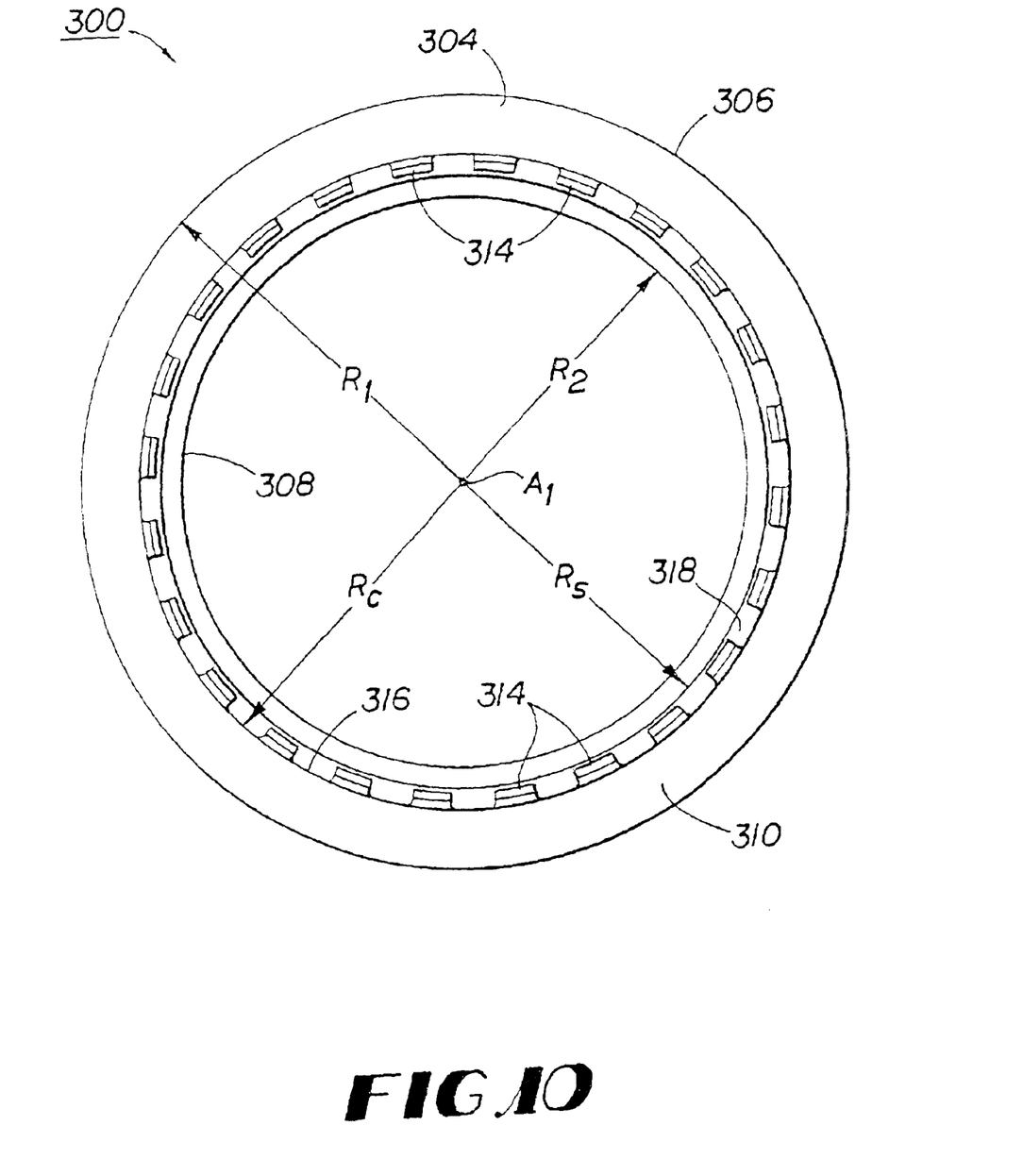
FIG. 10 is a top view of a first ring of the holding apparatus as shown in FIG. 8.

The apparatus 500 further includes a second ring 400. As shown in FIGS. 7–9, in one embodiment, the second ring 400 has a base 402 and a ring body 408. The base 402 has a first surface 404 and an opposite second surface 406. The ring body 408 is formed on the first surface 404 of the base 402. The ring body 408 has a longitudinal axis ($A_2$), a top surface 410, an outer surface 412 and an interior surface 414. The outer surface 412 is characterized by a first radius, $R'_1$, and the interior surface 414 is characterized by a second radius, $R'_2$. A plurality of teeth 416 are formed on the top surface 410 in a circle 418 and protruding away from the ring body 408 along the longitudinal axis $A_2$. The circle 418 has a radius, $R'_c$, complementary to the radius of the mold 60, $R_m$, to allow the plurality of teeth 416 to be capable of receiving and holding the mold 60. Each of the teeth 416 has a bottom 420, a tip 422, and a body portion 424 formed therebetween. Moreover, each of the teeth 416 has a step 426 formed on the body portion 424 inwardly toward the longitudinal axis $A_2$ to partially receive and support the mold 60. The plurality of teeth 416 and steps 426 collectively receive, hold and support the mold 60. Note that while the steps 426 provide further support to the mold 60 received therein, it is not necessary to have the steps 426 in the second ring 400 because the plurality of teeth 416 can adequately receive and hold the mold 60. Moreover, it is not necessary for each of the plurality of the teeth 416 to have a step 416. Additionally, the steps 426 can be alternatively replaced by a step formed in a substantially ring-like structure such as step 318 of the first ring 300.

The plurality of teeth 416 can be formed with elastic materials such as plastics, metals or like such as NORYL, a plastic material sold by GE Plastics, DELRIN, a plastic material sold by Du Pont, or may be other plastic materials such as polypropylene. Each of the plurality of teeth 416 has a width, a thickness, and a length. The width, the thickness and the length of each of the plurality of teeth 416 are in the range of 0.1 cm to 2.0 cm, 0.01 cm to 0.5 cm, and 0.1 cm to 2.0 cm, respectively. There is no requirement for the total number of the plurality of teeth 416. In general, the number of the plurality of teeth 416 is a number no smaller than 2. However, in an extreme case, the plurality of teeth 416 can be merged together to form a unified ring, which is an alternative embodiment of the present invention and the number of the plurality of teeth 416 is one. The plurality of teeth 416 can be substantially identical to, or different from, each other. The plurality of teeth 416 can be uniformly, or non-uniformly, distributed along the circle 418. Different parts of the second ring 400 can be made from same material, or different materials. In the embodiment as shown in FIGS. 7–9, the second ring 400 is manufactured by molding and made from a plastic material such as NORYL, a plastic material sold by GE Plastics, DELRIN, a plastic material sold by Du Pont, or may be other plastic materials such as polypropylene.

The apparatus 500 further has a sleeve 428 to cooperate with the second ring 400. In one embodiment and as shown in FIGS. 7–9, the sleeve 428 has an interior surface 430 and an opposed outer surface 432, a first end 431 and a second end 433, a longitudinal axis and a diameter complementary to the ring body 408 of the second ring 400 to allow the sleeve 428 to be received on the first surface 404 of the base 402 such that the sleeve 428 and the ring body 408 are co-axial.

Various coupling mechanisms can be utilized to rotatably couple sleeve 428 to the ring body 408. In one embodiment as shown in FIG. 8, the ring body 408 has a groove 434 formed on the outer surface 412 around the longitudinal axis, and the sleeve 428 has at least one hole 436 formed between the outer surface 412 and the interior surface 414. At least one locking pin 440 is received in the hole 436 of the sleeve 428 and the groove 434 of the ring body 408 to couple the ring body 408 and the sleeve 428 together. Because the groove 434 is formed on the outer surface 412 around the longitudinal axis, the locking pin 440 can move around the longitudinal axis in the groove 434 when the sleeve 428 is rotated.

The sleeve 428 further has marks 438 indicating angular positions. In one embodiment as shown in FIG. 7, marks 438 are positioned on the first end 431 and the outer surface 432 of the sleeve 428. Alternatively, marks 438 can be positioned on the first end 431 or the outer surface 432 of the sleeve 428, respectively. Cooperating with a mark 338 positioned on the mold 60, marks 438 can be utilized to orient the mold 60 at a proper angular position relative to another mold (not shown) so that the molds will be positioned properly to have a desired relative orientation.

In operation, referring now to FIGS. 7 and 8, one can use the first ring 300 to pick up the mold 60 with the plurality of teeth 314 towards the second surface 64 of the mold 60 to receive and hold the mold 60 so that the optical surface 62 of the mold 60 is facing away from the first ring 300. By doing so, the risk of the optical surface 62 being accidentally touched by human hands is greatly reduced. Moreover, it is easy to handle, process or transport the mold 60 by handling the first ring 300 when the mold 60 is received in the first ring 300. For example, once the mold 60 is received and supported in the first ring 300, one can access to the optical surface 62 to apply a coating therein through the opening 302.

Additionally, one can take the combination of the mold 60 and the first ring 300 and direct the mold 60 so that the optical surface 62 of the mold 60 faces the second ring 400. Care should be taken to ensure that the first ring 300 and the second ring 400 are positioned properly and co-axial. The first ring 300 can be moved and pushed towards the second ring 400 so that the second ring 400 receives and holds the mold 60 with the optical surface 62 of the mold 60 facing towards to the first surface 404 of the base 402 of the second ring 400. In this configuration, the optical surface 62 is isolated from the outside by the base 402, the sleeve 428 and the second surface 64 of the mold 60 and therefore is protected from dirt, accidental touch or damage. The mold 60 can then be stored and/or transported with the second ring 400 for further processing. For example, the mold 60 can be transported to the holding device 100 for assembly. The first ring 300 can be removed from the mold 60. Alternatively, the first ring 300 can stay with the mold 60.

The mold 60 as shown in FIGS. 7 and 9 has a concave optical surface 62. The mold 60 can be a front mold or a back mold. Thus, the mold 60 may alternatively have a convex optical surface. The apparatus 500 can still be utilized to hold, transfer and protect the mold with the convex optical surface as discussed above. In this case, one can first use the second ring 400 (as a first ring) to pick up the mold with the convex optical surface facing towards to the first surface 404 of the base 402 of the second ring 400. Then the first ring 300 can be used (as a second ring) to pick up and hold the mold from the second ring 400. The mold can then be held, processed and/or transported.

From the above discussion, the apparatus 500 can be considered as an optical device or mold carrier. Note that while the apparatus 500 is described to utilize the first ring 300 and the second ring 400, each of the first ring 300 and the second ring 400 can be used individually.

Although the present invention has been described with reference to specific details of certain embodiments thereof, it is not intended that such details should be regarded as limitations upon the scope of the invention except as and to the extent that they are included in the accompanying claims.

What is claimed is:

1. A method for molding an optical lens using a front mold and a back mold with facing inside surfaces that are a negative image of the surfaces of the optical lens and that are at a proper distance and rotational orientation to each other, each of the front mold and back mold having an edge, comprising the steps of:

a. wrapping a strip around the edges of the front mold and back mold to form a sleeve, wherein the strip has a body portion having a first end and an opposed second end, an interior surface and an opposed outer surface, a first flange and a second flange, and a partially encircled portion defining an elongated channel extending from the first end to the second end, wherein the partially encircled portion is located between the first flange and the second flange and protruding away from the outer surface of the body portion, and the inside surface of the body portion defines an opening therein between the first flange and the second flange in fluid communication with the elongated channel, and wherein the formed sleeve has a longitudinal axis and a diameter and cooperates with the front mold and the back mold to define a molding cavity, the molding cavity being in fluid communication with the elongated channel through the opening;

b. injecting a fluid lens-forming material into the molding cavity through the elongated channel; and c. curing the fluid lens-forming material to form the optical lens.

2. The method of claim 1, wherein the strip is made from a nonadhesive plastic film.

3. The method of claim 2, wherein the nonadhesive plastic film comprises an elastomeric material that is selected from the group of polyurethane, polyvinyl chloride, organosilicon elastomer and thermoplastic rubbers containing a styrene-ethylene-propylene (butylene) block copolymer.

4. The method of claim 2, wherein the thickness of the non-adhesive plastic film is between 1.0 millimeter and 8.0 millimeter.

5. The method of claim 1, further comprising the step of securing together in face-to-face engagement of the interior surfaces of the first and second ends of the strip to form the sleeve to close the molding cavity and to form a tail.

6. The method of claim 5, further comprising the step of using the tail as a handler to handle the molds.

7. The method of claim 5, further comprising the step of using a port, which is formed by the portion of the elongated channel at the first end and the portion of the elongated channel at the second end after the first end and the second end are secured together in the face-to-face engagement of the interior surfaces of the first and second ends of the strip, as a venting channel and a passage for establishing a fluid communication to the molding cavity.

8. The method of claim 5, further comprising the step of placing a plug in a direction substantially parallel to the longitudinal axis, across the edges of the front mold and the back mold and between the first end and the second end before the first end and the second end are secured together to close the molding cavity.

9. The method of claim 8, wherein the plug is made from a nonadhesive plastic material.

10. The method of claim 9, wherein the nonadhesive plastic material comprises an elastomeric material that is selected from the group of polyurethane, polyvinyl chloride, organosilicon elastomer and thermoplastic rubbers containing a styrene-ethylene-propylene (butylene) block copolymer.

11. The method of claim 9, wherein the plug cross-sectionally is triangular.

12. The method of claim 1, wherein the step of wrapping comprises the step of wrapping around the edges of the front mold and back mold with the interior surface of the strip in direct contact with the edges of the front mold and back mold.

* * * * *